United States Patent [19]

Tepas, Jr. et al.

[11] 4,032,035

[45] June 28, 1977

[54] CHILD-RESISTANT COVER FOR CONTAINERS

[75] Inventors: Joseph J. Tepas, Jr., Easton, Conn.; Arlon G. Sangster, Sterling, Mass.

[73] Assignee: Olin Corporation, New Haven, Conn.

[22] Filed: Mar. 7, 1975

[21] Appl. No.: 556,362

Related U.S. Application Data

[63] Continuation-in-part of Ser. No. 437,077, Jan. 28, 1974, Pat. No. 3,870,471.

[52] U.S. Cl. .............................. 220/318; 215/294; 215/359; 220/325; 220/326
[51] Int. Cl.² ........................................ B65D 45/16
[58] Field of Search .......... 220/318, 324, 325, 326, 220/323, 298; 215/294, 359, 363

[56] References Cited

UNITED STATES PATENTS

| | | | |
|---|---|---|---|
| 2,583,460 | 1/1952 | Zepelovitch | 215/294 |
| 3,118,561 | 1/1964 | Klaus | 220/324 |
| 3,158,279 | 11/1964 | Callegari | 220/318 |
| 3,680,730 | 8/1972 | Schlanger | 220/324 |

*Primary Examiner*—Stephen P. Garbe
*Assistant Examiner*—Joseph M. Moy
*Attorney, Agent, or Firm*—James B. Haglind; Donald F. Clements; Thomas P. O'Day

[57] ABSTRACT

A container cover is provided which prevents young children from gaining access to the container's contents. The container has an opening at one end and a latch lip adjacent to the opening. The cover comprises a plate having at least one opening and a handle secured to the plate and having at least two grips, a releasing grip and a non-releasing grip. Two latching means secure the plate to the latch lip, one of the latching means is attached to the releasing grip and passes through the plate opening. The releasing grip has means for releasing the latching means such as lifting, sliding or rotating.

The container may be used for containers for materials which may be harmful if handled or ingested.

A particular application of the cover is on a magazine for soluble solids to be dissolved by a liquid, for example, in treating swimming pool water. The magazine is a component of an apparatus for dissolving and dispensing soluble material including a container having an upper and a lower chamber. The upper chamber is separated into a first and a second compartment. A rotary receptacle in the first compartment receives liquid through an inlet in the first compartment and is periodically emptied, releasing precisely the same amount of liquid each cycle. The second compartment contains a magazine which holds soluble solids to be dissolved by the liquid. A control valve regulates the amount of liquid contact with the solid. The lower chamber receives the solution from the second compartment and through valve means releases the solution into the liquid system to be treated.

22 Claims, 11 Drawing Figures

CHILD-RESISTANT COVER FOR CONTAINERS

This application is a continuation-in-part of application Ser. No. 437,077, filed Jan. 28, 1974, now U.S. Pat. No. 3,870,471.

This invention relates to a cover for a container. More particularly, the invention relates to a cover which cannot be readily removed and access gained to the contents of the container, for example, by young children.

Various attempts have been made in the packaging of commercial products to provide a cover or closure which is easily removable by adults, but which cannot be readily removed by small children. These covers are known as child-resistant or child-proof closures. Most frequently they are a single unit such as a cap, which requires certain manipulations for removal. The manipulations include combinations such as pressing and turning, squeezing and turning, pressing and lifting, and the like.

Now it has been found that child-resistant covers can be produced which add the dimension of visual deceptiveness to the requirement of a combination of manipulations.

These child-resistant covers are suitable for use on containers holding solid materials for example in granular or tabletted form. Such containers are frequently employed in the chemical and pharmaceutical industries. A particular application is the use of the cover on a magazine for holding soluble solids to be dissolved by a liquid. For example, in treating swimming pool water with an aqueous solution of an available halogen containing compound.

The novel cover of the present invention is suitably used on a container having an opening at one end and having a latch lip adjacent to the opening. The cover comprises a plate, and a handle secured to the plate. The handle has at least two grips one being a releasing grip and the other a non-releasing grip. Two latching means are used to secure the plate to the latch lip. The releasing grip on the handle has means to release one of the latching means from the latch lip.

The cover of the present invention is suitably used with a recently developed dispensing apparatus for accurately controlled concentrations of treated solutions which are substantially independent of changes in the pressure conditions in the system being treated. The dispenser provides controlled turbulence in the area of liquid-solute contact and prevents undesired contact between the liquid and the soluble material. Continuous immersion of the soluble material in the liquid is avoided by the dispensing apparatus. Periodic release of a controlled quantity of liquid from the receptacle permits liquid-solute contact which is essentially unaffected by changes in liquid flow rates. The dispensing apparatus permits a zero feed rate of soluble material while maintaining a continuous flow of liquid through the apparatus under normal operating conditions.

This recently developed dispenser, disclosed in U.S. Pat. No. 3,802,845, issued Apr. 9, 1974 to Joseph J. Tepas, Jr., includes a closed container having an upper chamber and a lower chamber and at least one partition separating the two chambers. The upper chamber is separated into a first and second compartment by a divider. The first compartment contains an inlet for liquid in its upper part and a rotary receptacle for receiving the liquid from the inlet. When filled, the receptacle rotates and discharges the liquid and returns to its original position to receive additional liquid. A channel in the divider between the first and second compartments permits the liquid to flow into the second compartment, the flow being regulated by a valve. A magazine in the second compartment for holding soluble solid materials has a grid at the lower end. Liquid flowing into the second compartment, rises up through the grid and contacts the soluble solid, forming a solution. The concentration of the solution is controlled by the valve setting regulating liquid flow rate. The solution formed passes through an opening between the second compartment and the lower chamber. A valve in the lower chamber regulates the flow of solution from the dispenser to the body of liquid to be treated.

U.S. Pat. No. 3,860,394, issued Jan. 14, 1975, to Joseph J. Tepas, Jr., and Arlon G. Sangster, discloses an improved means to control liquid flow from the first compartment to the second or dissolving compartment. This flow control means is a rotary member having a cup and an aperture permitting a variable portion of the liquid from the rotary receptacle to pass directly to the lower chamber without passing through the dissolving compartment.

When a highly concentrated solution is to be dispensed, a large portion of the liquid contacts the soluble solid. When dispensing a solution of low concentration, a small portion of the liquid contacts the soluble solid. This small portion, however must dissolve sufficient solid to form a relatively concentrated solution in the dissolving compartment. This concentrated solution is then diluted to the desired concentration in the lower chamber and dispensed to the body of liquid to be treated. Improved operation is attained by allowing a large portion or all of the dissolving liquid to pass through the dissolving compartment to provide better mixing in the dissolving compartment.

It is desirable therefore to provide a dispensing apparatus which permits a large portion or all of the liquid to pass through the dissolving compartment while maintaining the concentration of the solution dispensed at the desired level.

An improved control means, especially useful in an apparatus for dissolving and dispensing soluble material to form an improved dispensing apparatus, includes in combination a closed container having an upper chamber and a lower chamber and at least one partition separating the chambers. The upper chamber is separated into a first and a second compartment by a divider. An inlet in the upper part of the first compartment introduces liquid from an external source into a rotary receptacle housed in the first compartment. The receptacle is located below the inlet and is attached to the sidewalls of the first compartment by a pair of trunnions. Means are provided for periodically emptying liquid from the receptacle. Liquid flow is regulated by a first flow control means associated with at least one opening for controlling liquid flow between the first compartment and the second compartment. A magazine in the second compartment for holding soluble solids has a pervious lower end permitting liquid from the receptacle to contact the solids. At least one opening is provided in the second compartment permitting liquid to flow between the second compartment and the lower chamber. An outlet in the lower chamber is equipped with a second flow control means which permits the regulation of liquid flow through the outlet.

FIGS. 1–3 show various embodiments of the improved dispenser. FIGS. 4–11 illustrate the novel cover of the present invention. Corresponding parts have the same identifying numbers in FIGS. 1–11.

Figure 1:
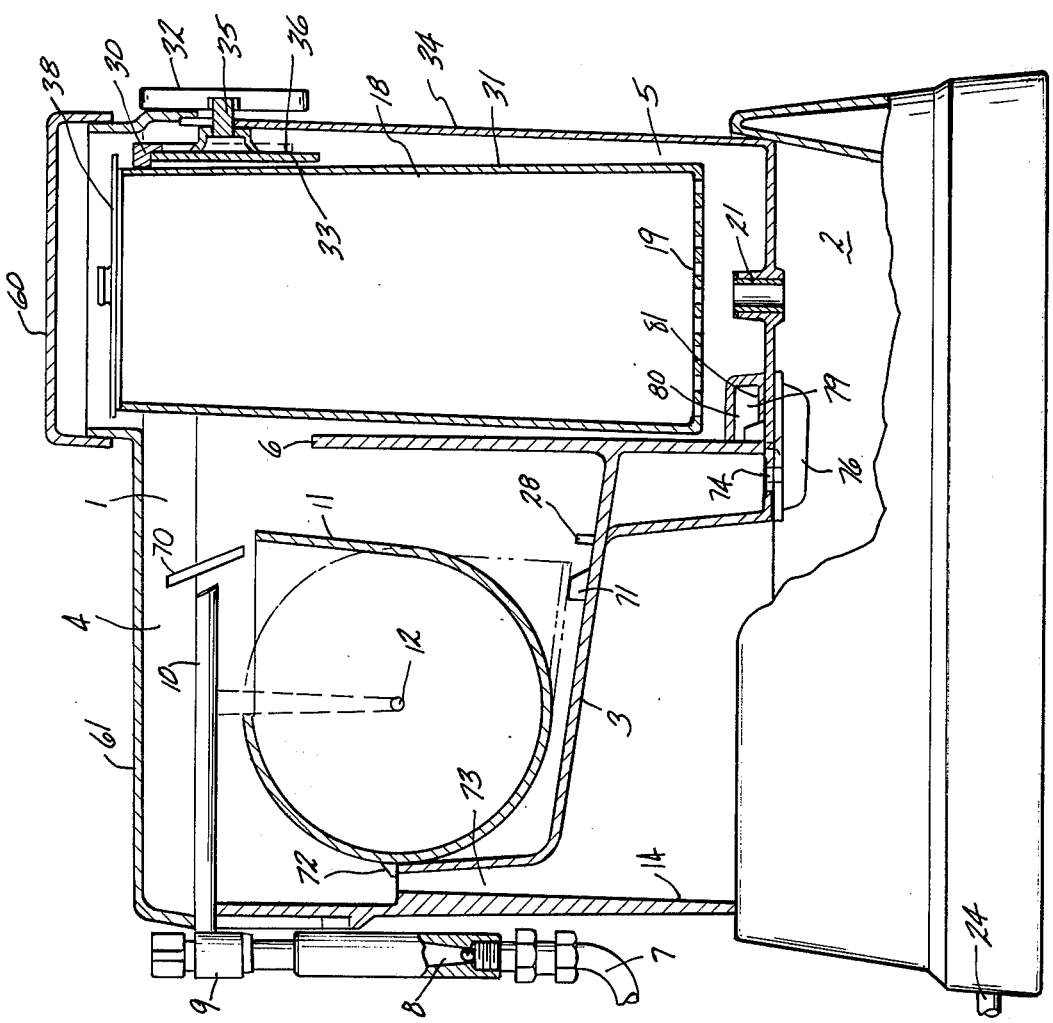
FIG. 1 is a partial vertical cross section of one embodiment of the dispensing apparatus.

The dispensing apparatus, as shown in FIG. 1, is divided into upper chamber 1 and lower chamber 2 by partition 3. Upper chamber 1 is separated into first compartment 4 and second compartment 5 by divider 6. Liquid from an external source enters the apparatus by way of tube 7 passing through flow indicator 8 and inflow valve 9 into inlet 10 attached to the upper part of wall 14 of first compartment 4 and below cover 61. Deflector 70 is inserted at the discharge end of inlet 10 to deflect the liquid into rotary receptacle 11, which is attached to the side walls of first compartment 4 by means of a pair of trunnions 12. Receptacle 11 empties itself when the liquid volume reaches a predetermined level by pivoting on trunnions 12 stopping when the front edge of receptacle 11 contacts protuberance 71. Baffle 28 reduces splashing when liquid is released from receptacle 11.

Upon emptying, receptacle 11 returns to its original position, stopping when protuberance 72 on receptacle 11 contacts the edge of opening 73. Opening 73 allows liquid to flow directly between first compartment 4 and lower chamber 2 in the event of a build-up of liquid in first compartment 4. Liquid from receptacle 11 flows down partition 3 through opening 74 in partition 3. Cup 76, attached to partition 3, directs the flow of liquid from first compartment 4 down through opening 74 into cup 76 and from cup 76 up through opening 79 in partition 3, the liquid passing through channel 80 and into second compartment 5.

Magazine 18 is housed in second compartment 5 having removable cover 60. Magazine 18 has a lower pervious end comprising grid 19 which supports a liquid soluble particulate material (not shown).

Yoke 30 is attached to wall 31 of magazine 18. Dial 32 is engaged by cam 33 through opening 35 in wall 34 of compartment 5. Cam 33 engages yoke 30 through an opening (not shown) in the plate 36 of yoke 30. The rotation of dial 32 turns cam 33 which moves yoke 30 and thus magazine 18 vertically. Soluble solid particulate materials are introduced into magazine 18 through removable cover 38. Dial control settings (not shown) are indicated along the circumference of dial 32. From second compartment 5 the solution formed passes down through drain 21 into lower chamber 2.

Figure 2:
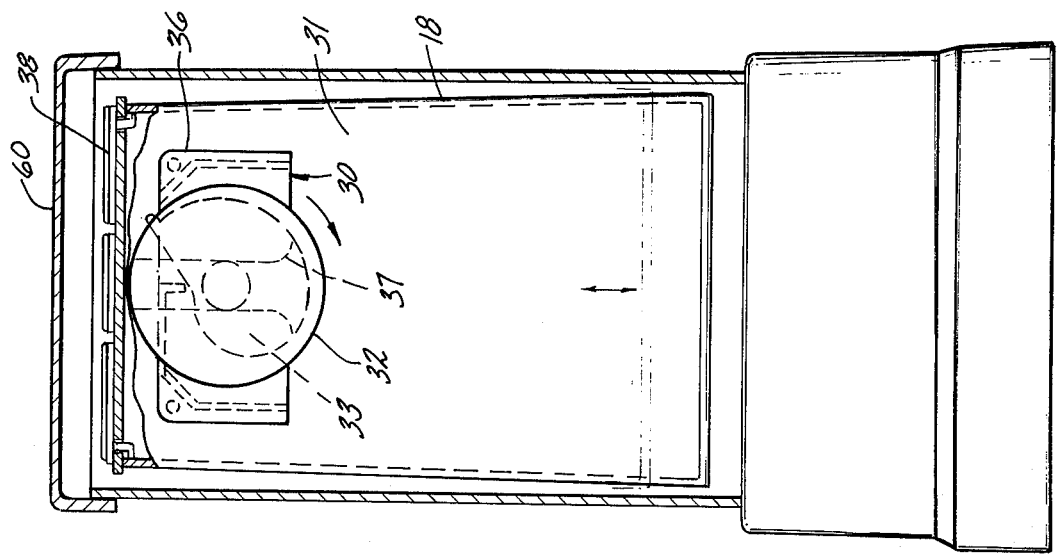
FIG. 2 is a front view of the embodiment of FIG. 1.

FIG. 2 illustrates a frontal view of the vertical adjustment means of FIG. 1. Yoke 30 is comprised of plate 36 attached to and spaced apart from wall 31. Cam 33 is inserted between wall 31 and plate 36. Cam 33 engages dial 32 through opening 37 in plate 36 and opening 35 (not shown) in wall 34 of compartment 5.

Figure 3:
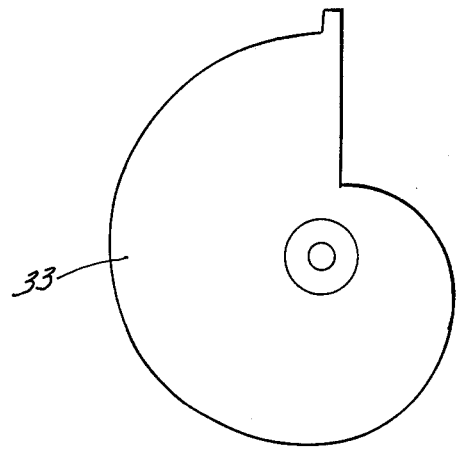
FIG. 3 is a front view of one embodiment of the cam employed in FIGS. 1 and 2.

FIG. 3 represents one embodiment of cam 33 employed in the dispensing apparatus.

Figure 5:
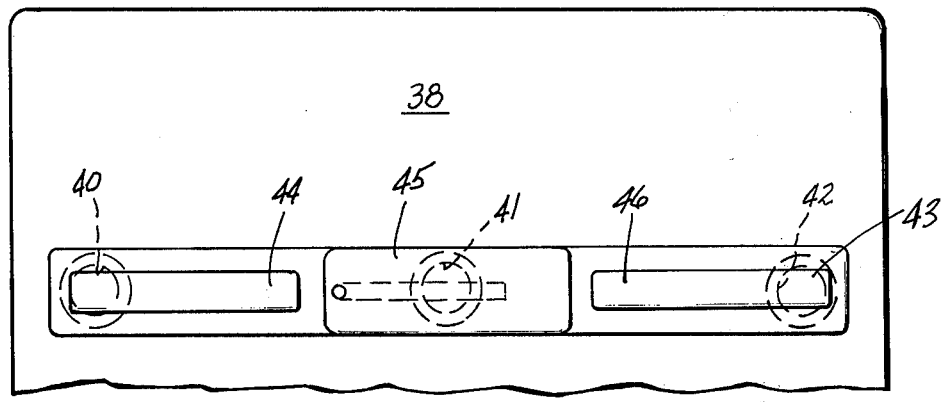
FIG. 5 is a top view of the embodiment of FIG. 4.
Figure 4:
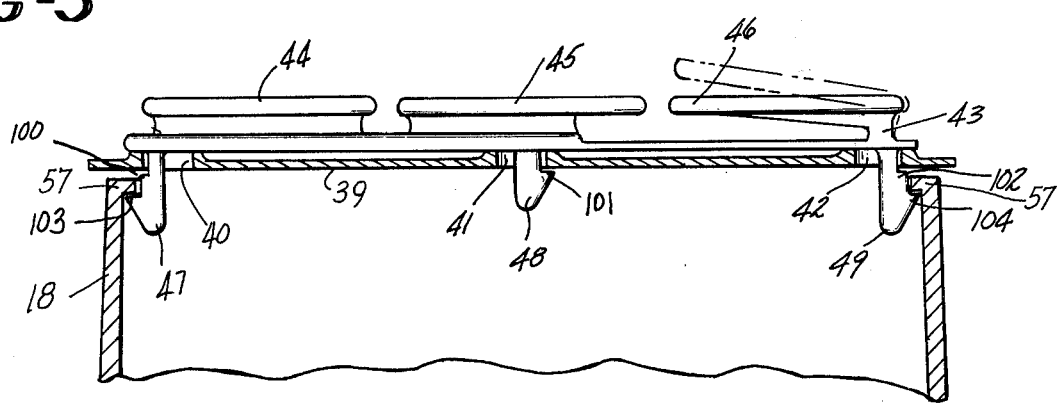
FIG. 4 is a side view of one embodiment of the novel cover of the magazine employed in FIG. 1.

FIGS. 4 and 5 depict a side view and front view respectively of an embodiment of novel cover 38 of magazine 18.

Handle 43 having grips 44, 45 and 46 and latches 47, 48, and 49 is attached to cover plate 39 by forcing latches 47, 48 and 49 through openings 40, 41 and 42 respectively in cover plate 39. The resilient material is deformed to allow entry of latches 47, 48 and 49 respectively and upon assuming its original shape, is secured to cover plate 39 by notches 100, 101 and 102 engaging the edges of openings 40, 41 and 42 respectively. In like manner notches 103 and 104 engage latch lips 57 on container 18. Of the three grips, only grip 46 has sufficient flexibility to bend enough to release latch 49 and permit cover 38 to be removed. A lifting force applied to either of grips 44 or 45 or the outer edge of grip 46 will not remove cover 38 but will instead remove magazine 18 from compartment 5.

Figure 7:
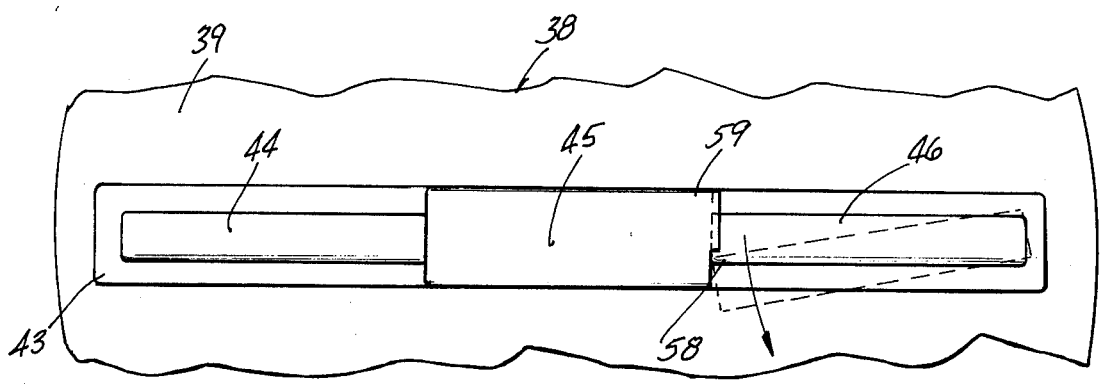
FIG. 7 is a front view of the embodiment of FIG. 6.
Figure 6:
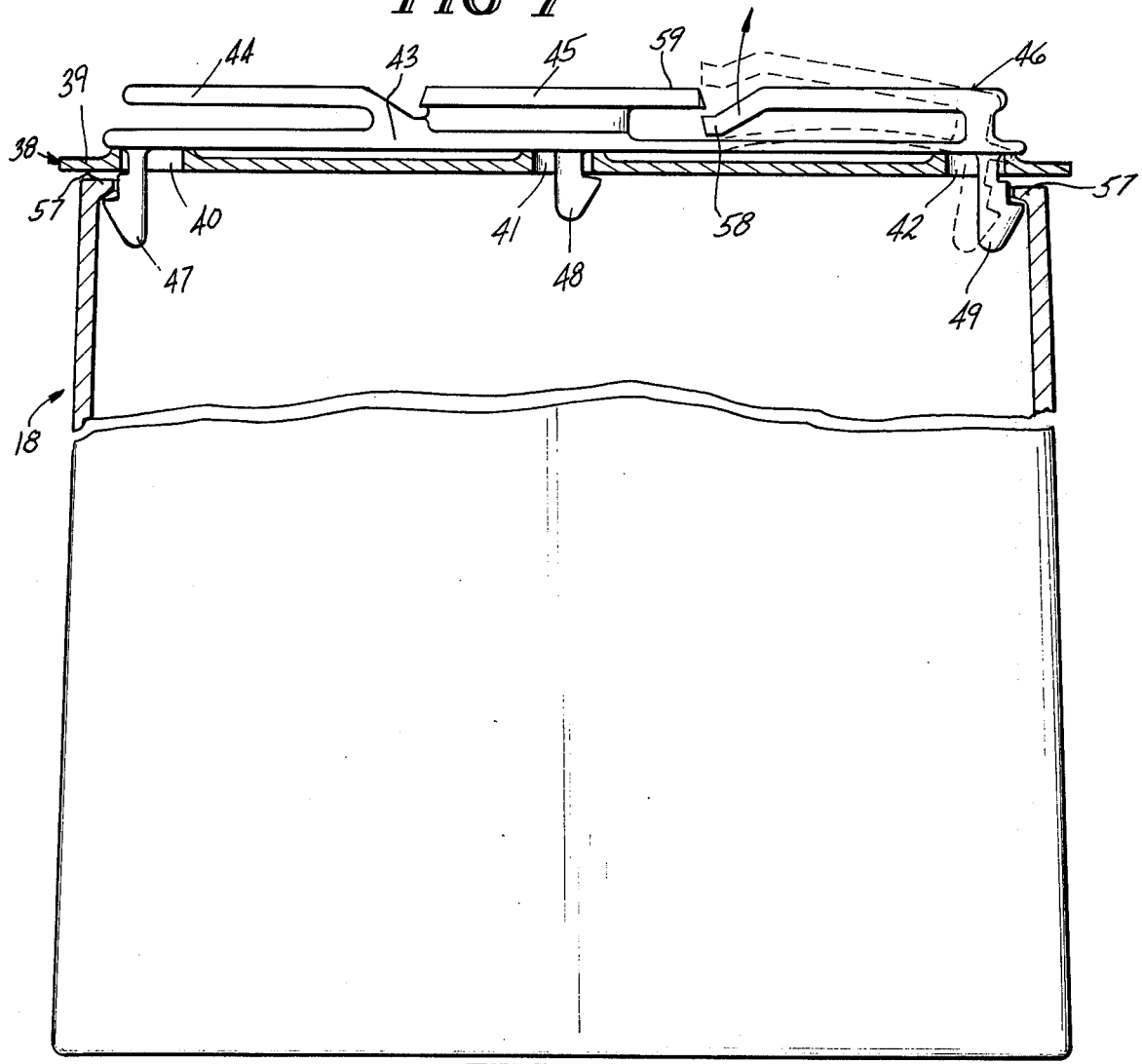
FIG. 6 is a side view of an alternate embodiment of the cover.

FIGS. 6 and 7 illustrate a side view and front view respectively of an alternate embodiment of cover 38.

Cover plate 39 and handle 43 are secured to container 18 by latch 49 and latch 47 adapted to be secured to latch lip 57 of container 18. Latch 49 is attached to handle 43 adjacent to releasing grip 46 while latches 47 and 48 are attached to handle 43. Releasing grip 46, flexibly mounted on handle 43, has edge 58 positioned below edge 59 of non-releasing grip 45. Compressing and moving laterally edge 58 of releasing grip 46 frees edge 58 from edge 59 of non-releasing grip 45. Raising releasing grip 46 releases latch 49 from latch lip 57 of container 18. This permits cover 38 to be removed from latch lip 57 of container 18. Latch 48, attached to non-releasing grip 45, secures handle 43 to cover plate 39.

Figure 8:
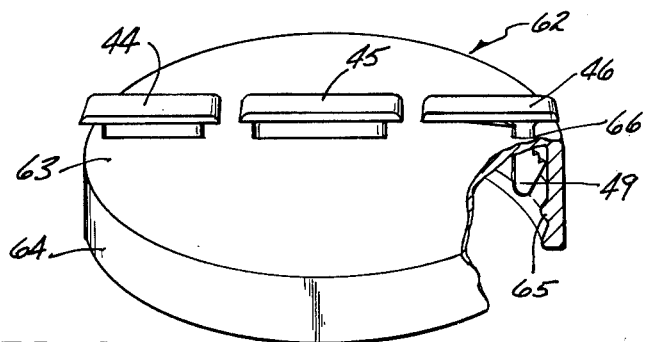
FIG. 8 is a perspective view of an additional embodiment of the cover.
Figure 9:
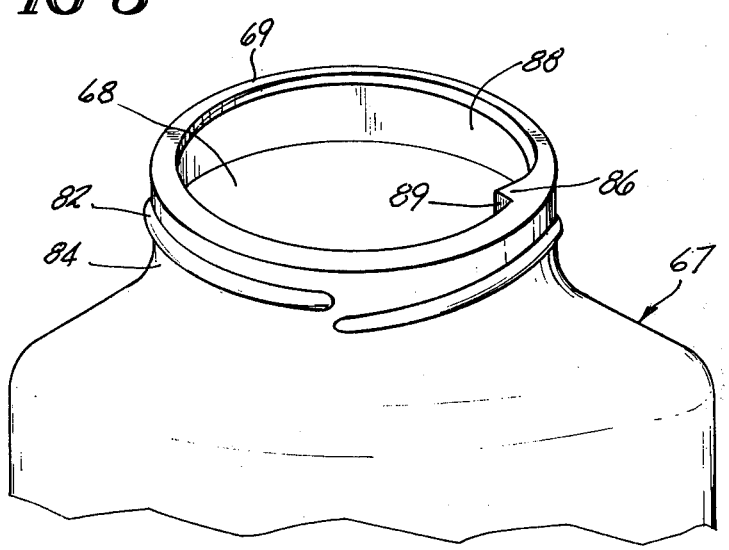
FIG. 9 is a front view of the container employed with the cover embodiment of FIG. 8.

FIG. 8 shows a perspective view of an additional embodiment of the cover with a portion cut away. Cover 62 has the handle integrated with cover plate 63. Cover plate 63 has skirt 64 having integral threads 65. Cover plate 63 has an opening 66 for latch 49, attached to releasing grip 46. Non-releasing grips 45 and 44 are also attached to cover plate 63.

Container 67 has opening 68 surrounded by neck 69. Neck 69 has thread 82 on external side 84 and latch lip 86 on internal side 88. Lock step 89, at the edge of latch lip 86, secures latch 49 against rotation.

Cover 62 is secured to container 67 by meshing thread 65 on skirt 64 with thread 82 on neck 69. Cover 62 is then turned until latch 49 is secured beyond lock step 89 of latch lip 86. Latch 49 rides up an incline on latch lip 86 and moves outwardly beyond lock step 89. Cover 62 is released by rotating anti-clockwise until latch 49 strikes lock step 89. Cover 62 is released for further rotation by lifting releasing grip 46 to free latch 49 from lock step 89 and turning cover 62 to remove it from container neck 69.

Figure 10:
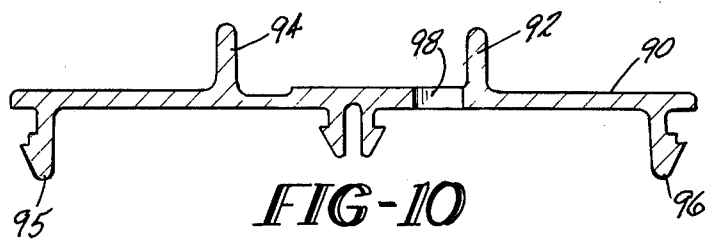
FIG. 10 is a side view of an alternate embodiment of the cover.
Figure 11:
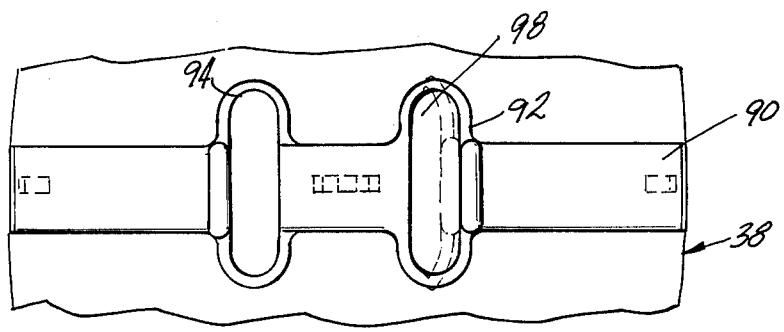
FIG. 11 is a front view of the cover of FIG. 10.

FIGS. 10 and 11 depict a side and front view of a further embodiment of the cover of the present invention. Handle 90 has releasing grip 92 and non-releasing grip 94 attached. Releasing latches 95 and 96 are attached at opposite end of handle 90. Releasing grip 92 is an integrally molded spring having opening 98. Sliding releasing grip 92 towards non-releasing grip 94 releases latch 96 and cover plate 90 can be removed from a container.

The novel removable cover of the present invention permits the magazine to be filled with soluble material in a form which is suitable for dissolving in the liquid being supplied to the apparatus of the invention. Its construction however prevents the cover from being readily removed and access gained to the soluble solid, for example, by young children. While a magazine is a preferred embodiment for containing the soluble solids, it will be recognized that other supports or holders having suitable openings for liquid may be used.

The novel cover of the present invention is comprised of a plate which contacts the opening of the container and a handle. The plate and the handle may be an integral unit to comprise the cover or the handle may be separate from the plate. The handle has at least two grips, a releasing grip and a non-releasing grip. The releasing grip may have a latching means attached. Whether the non-releasing grip has latching means attached is optional. In a preferred embodiment, however, the non-releasing grip has latching means attached. Where the latching means are attached to the releasing or non-releasing grip an opening is required in the plate. The latching means attached to the releasing grip passes through the opening in the plate and is secured to the latch lip of the container. Where the non-releasing grip has latching means, these latching means may by secured to the latch lip of the container or where the handle is separate from the plate, the latching means on the non-releasing grips may be used to attached the handle to the plate. It is desirable that the appearance of the releasing grip and the non-releasing grip be substantially the same. This like appearance between the two types of grips on the handle enhances the difficulty for the removal of the cover by a small child. As a further deterrent to removal by children, the integral spring may be made too stiff to be released by a child.

Any suitable releasing means may be used to detach the latching means attached to the releasing grip to the latch lip of the container. Suitable releasing means include lifting or pressing the releasing grip, pivoting or rotating the releasing grip, sliding the releasing grip, or a combination of these means. In a preferred embodiment, the releasing grip has sufficient flexibility to flex or bend when raised or depressed to release the latching means for the latch lip, and permit the cover to be removed from the container.

In another embodiment, as illustrated in FIG. 8, the cover includes a rim or skirt which may be attached to or separate from the cover plate. The rim or skirt may have threads which when meshed with threads adjacent to the opening of the container permits the cover to be screwed onto the container. Thus, the cover is secured to the container by a combination such as turning with one of the means used for releasing the latch means attached to the releasing grip.

The novel cover of the present invention may be used with any suitable container having an opening at one end including jars, cans, bottles, and the like.

A latch lip is located adjacent to the opening of the container. The latch lip located on the wall adjacent to the opening may be on the internal or external side of the wall. The lip may be continuous or non-continuous, for example, in the form of a rim or segment which has sufficient depth to accommodate the latching means. Where both turning means and latching means are employed to secure the cover, the latch lip may have a lock step, protuberance or stop to limit the movement of the latch means along the latch lip.

Where turning means are employed as one of the manipulations used to secure and remove the cover, it is preferred that the threaded means used preferably encompass less than a full turn before contacting the lock step and less than an additional full turn before disengagement of threads. This permits the cover to be rotated, the latching means to be released and the cover turned and removed without requiring the releasing grip to be held continuously while turning the cover.

In a further embodiment, the child-resistant cover of the present invention comprises a cover plate having a handle having two releasing grips. The cover may combine, for example, grips of the type used in FIGS. 10 and 11 with the threaded cover plate of FIG. 8. The grips may be in the form of integrally molded springs having an opening in the center of the molded ring. By sliding or compressing the releasing grips toward each other and then rotating the cover plate, the cover may be removed from the container.

The dispensing apparatus is suitably fabricated of metal or plastic depending on the solute and liquid with which it is to be used. When solid hypochlorites, for example, calcium hypochlorite, or solutions of hypochlorites are employed, the materials of construction are preferably those resistant to its action. Particularly suitable for this purpose are a considerable number of plastic compositions, for example, Lucite which has the additional advantage of transparency. The apparatus may also be constructed of other resins, for example, acrylonitrile-butadiene-styrene, Bakelite, nylon, polyethylene, polyvinyl chloride, and polystrene and of suitable metals including copper, brass, stainless steels, and titanium.

The dispensing apparatus is designed to operate with liquid supplied at suitable pressures and may be operated without controlling means for liquid flow rates. In systems with highly variable liquid flow rates, it may be desirable, however, to equip the inlet with means to regulate liquid flow. In the case of treating swimming pool water, for example, control means combining a visual flow indicator and a valve member are useful in indicating a pressure buildup in the filter or at the hair and lint screen and to provide visible check valve function when the filter pump stops. An example of a suitable inlet liquid flow control means is a combination of a ball flow indicator and a tee valve.

The receptacle for the liquid is self-emptying and provides for the release of liquid on a periodic basis, controlled, for example, by a predetermined volume or weight of liquid. It can, for example, be shaped generally cylindrical, ellipsoidal or circular, having at least one opening for liquid to enter and be discharged. In one embodiment, a tear drop shaped receptacle is attached to the walls of the container, for example, by a pair of trunnions or pivot pins and is carefully balanced so that upon emptying the liquid it returns by gravity to its original position. A stopping means for maintaining the receptacle at a suitable position for filling may be provided by the appropriate length of the inlet tube or by appropriately located protuberance as shown in FIG. 1.

One or more openings can be provided in the first compartment to permit flow of liquid directly to the lower chamber. A suitable example is an opening or overflow tube which prevents the build-up of liquid in the first compartment.

The vertical adjustment apparatus for controlling the height of the tablet magazine permits a wide range of solution concentrations to be dispensed. The cam may have any suitable configuration which permits the desired change in the height of the magazine in the dissolving compartment. It is preferred that the configuration of the cam permit change in the height of the magazine over any selected distance. In one embodiment, the configuration of the cam is a noncircular continuous curve increasing in slope from 0° to about 340°. Its design therefore permits a continuous altering of the magazine height and thus the amount of contact with the soluble solid. The concentration of the solution to be dispensed can be varied by any degree and is not limited to specific intervals of change. The bracket attached to the magazine may be of any design which provides suitable means of engagement with the cam. In one embodiment, the bracket is a yoke which houses the cam and frictionally engages the cam along a face of a plate of the yoke. It will be readily understood that the vertical adjustment of the magazine cam also be made by an engagement of the cam with a wall of the magazine.

The vertical adjustment apparatus of the present invention can be used in combination with the first flow control means of U.S. Pat. Nos. 3,802,845 and 3,860,394. Where this is done, it is preferred that the first flow control means permit a large volume of liquid to flow into the second compartment. In a preferred embodiment, the first flow control means is a non-rotatable cup permitting all of the liquid to flow into the second compartment.

By permitting a large portion or all of the liquid to flow from the first compartment through the second or dissolving compartment, the desired concentration of solution is obtained while providing for adequate mixing. The concentration of solution formed in the dissolving compartment does not need to be inordinately high as the concentration of the solution in the lower chamber of the dispenser is close to or the same as that formed in the dissolving compartment.

The supply magazine has the form, for example, of a hollow rectangular or cylindrical solid having a pervious lower end. The magazine is insertable into the second compartment of the upper chamber and stop means are provided to establish the level of the pervious lower end of the magazine at an appropriate distance above the bottom of the compartment. The pervious lower end can be, for example, a grid of suitable mesh attached to the magazine and made integral therewith. The magazine can be removable from or made integral with the second compartment.

In a preferred embodiment, the magazine is tapered, the cross sectional area at the top being slightly smaller than the cross sectional area at the bottom, or pervious end. Such tapering is particularly desirable when tabletted materials are employed in the magazine. The tapering enhances the downward movement of unwetted tablets to replace wetted tablets being dissolved by the liquid and prevents bridging of the tablets when they are first contacted by the liquid.

The lower portion of the magazine is periodically submerged in liquid, with the volume of the submerged portion usually being no greater than about 5 percent of the total volume of the magazine. The extent of contact is regulated by the magazine's vertical adjustment means.

The vertical adjustment apparatus is able to vary the height of the magazine's grid above the partition separating the second compartment from the lower chamber. The grids height can be adjusted over any suitable range. The desired grid height being determined by the nature of the soluble solid employed, the liquid used as the solvent, and the size of the apparatus.

As soluble material dissolves at the pervious end of the magazine and is removed, the soluble material originally in the air space above and not wetted by liquid, gradually descends to the pervious end to replace that dissolved. Only soluble material about to be dissolved is contacted by liquid flowing across the pervious end of the magazine.

At least one opening, is provided to permit the flow of solution between the second compartment and the lower chamber. This may comprise, for example, a drain with a suitable dam to maintain liquid level near the grid at its lowest position. In addition, drain means suitably notched to minimize plugging by non-dissolved particles can be employed. If desired, drain means with a variable size orifice can be advantageously used especially where particulate materials of differing degrees of solubility are employed with a common solvent.

Release of solution from the lower chamber through outlet 24 to the liquid to be treated is controlled by a second flow control means, a float valve, for example, so arranged that air is prevented from being drawn into the pump suction line causing undesired introduction of air into the recirculating system.

The dispenser is designed to operate with liquid supplied at suitable pressure and to discharge the solution at or below atmospheric pressure into the liquid to be treated.

The rotary receptacle accumulates a volume of liquid and periodically instantaneously releases this liquid to a dissolving zone wherein the liquid contacts a soluble material in the lower end of the magazine to form a solution containing a carefully controlled amount of the soluble material. By releasing precisely the same amount of liquid during each cycle, accurately controlled solution concentrations are consistently obtained for a particular setting of the dial control. A wide range of concentrations are provided by the apparatus of this invention. For example, when dissolving solid calcium hypochlorite, available chlorine in amounts of from 0 to greater than about 4,000 grams per day can be supplied. In contrast, most currently available erosion type dispensing devices for chlorinating swimming pools cannot provide a zero feed rate of available chlorine while operating, nor can they feed more than approximately 300 grams of available chlorine per day when dissolving the prescribed available chlorine-containing compound.

The improved dispenser is used particularly advantageously when it is desired to dispense solutions of soluble solid materials supplied in a suitable form at accurately controlled rates. These rates are varied by controlling the volume of liquid in contact with the soluble material. The dispenser is particularly useful in the application of solid hypochlorites, for example, calcium hypochlorite, to bodies of water, for example, in treating water in swimming pools, water plants in small municipalities, bottling plants, dairies and cooling systems where the addition of a sterilizing agent or other chemical is desirable. The device also can be advantageously used in the treatment of industrial wastes to destroy color, odor and toxic constituents, and for odor and bacterial control in sewage effluents. Pressed tablets of calcium hypochlorite are especially suitable in the present apparatus, but granular shapes and sizes of particles are also suitable. The apparatus can be used for dissolving and feeding other chemicals, for example, sodium fluoride in minor amounts for water supplies, polyphosphates and compositions containing them for water softening, soda ash furnished as briquettes or fused soda ash for adjusting the alkalinity of aqueous bodies, sodium chloride, alum and available chlorine compounds other than hypochlorite include, for example, dichlorocyanuric acid and alkaline salts thereof, trichlorocyanuric acid and alkaline salts thereof, tetrachloroglycoluril, 1,2-dichloro-5,5-dimethylhydantoin and 1-chloro-3-bromo-5,3-dimethylhydantoin.

The following examples are presented to illustrate the improved dispenses more fully. All parts and percentages are by weight unless otherwise specified.

EXAMPLE I

A dispensing apparatus, substantially as shown in FIGS. 1, 2 and 3, was fabricated substantially of acrylonitrilebutadiene-styrene resin. Tear drop shaped receptacle 11 had a capacity of approximately one quart of liquid. Magazine 18 had a grid forming the pervious end and was filled with calcium hypochlorite briquettes containing 70 percent $Ca(OCl)_2$. Magazine height control wheel 32, which controls the amount of contact between the liquid entering the second compartment and the soluble solid on grid 19, was set at 2. At this setting, the grid was at a height of about 1.8 inches above the partition forming the bottom of the second compartment.

The dispensing apparatus was connected to a test stand simulating a swimming pool installation to test uniformity in maintaining available chlorine levels.

The test stand included a stirred tank having a capacity of 150 gallons of water.

Fresh water at a temperature of 85° F. was added to the dispensing apparatus at the rate of 15 gallons per hour.

At a control setting of 2, the dispensing apparatus was operated for a period of 3.25 hours. Analyses of the treated solution, taken at intervals of 1, 2 and 3.25 hours after starting liquid flow to the dispensing apparatus, showed an average available chlorine concentration of 71 parts per million, with the highest reading being 75 parts per million and the lowest reading 67 parts per million.

The example shows the accurate control of concentration of available chlorine in an aqueous solution attained during operation of the improved dispensing apparatus utilizing the improved vertical adjustment means.

EXAMPLE II

Using the apparatus of Example I, fresh water at a temperature of 85° F. was added to the dispensing apparatus at the rate of 15 gallons per hour. The magazine was filled with tableted calcium hypochlorite containing 70 percent $Ca(OCl)_2$. At a control setting of 4, the grid height was about 1.63 inches. The dispensing apparatus was operated for a period of about 5 hours. Four analyses of the treated solution taken at intervals during the period of operation showed an available chlorine concentration from 196 to 256 parts per million was maintained, the average being 242 parts per million.

EXAMPLE III

Using the apparatus of Example I, fresh water at a temperature of 85° F. was fed to the dispensing device at a rate of 7.5 gallons per hour. At a control setting of 6, the grid height was about 1.4 inches. The dispenser was operated for a period of about 4.5 hours. Four analyses of the treated solution taken at intervals during the period of operation showed an available chlorine concentration ranging from 477 to 505 parts per million.

What is claimed is:

1. A cover which is adapted to be used for a container having an opening at one end and having a latch lip adjacent to said opening, said cover comprising a plate, a handle secured to said plate having at least two grips, a releasing grip and a non-releasing grip, two latching means for securing said plate to said latch lip, said latching means being responsive to said releasing grip to enable removal of said cover, the appearance of said releasing grip and said non-releasing grip being substantially the same.

2. The cover of claim 1 in which said handle is integrated with said plate.

3. The cover of claim 2 in which one of said latching means is attached to said plate.

4. The cover of claim 3 in which said plate has a skirt.

5. The cover of claim 4 in which said skirt has thread means.

6. The cover of claim 2 in which said releasing grip is flexibly mounted on said handle.

7. In a combination of a container and a cover therefor, said container having an opening at one end and having a latch lip adjacent to said opening, said cover comprising a plate, a handle secured to said plate having at least two grips, a releasing grip and a nonreleasing grip, two latching means for securing said plate to said latch lip, said latching means being responsive to said releasing grip to enable removal of said cover, the appearance of said releasing grip and said non-releasing grip being substantially the same.

8. The cover of claim 7 in which said latch lip is continuous.

9. The cover of claim 7 in which said latch lip is non-continuous.

10. The cover of claim 9 in which said latch lip has a lock step to retain said latching means.

11. The cover of claim 7 in which said latch lip is positioned on an outside wall of said container adjacent to said opening.

12. The cover of claim 7 in which said plate has an opening, one of said latching means is attached to said releasing grip, and said latching means attached to said releasing grip passes through said opening in said plate.

13. The cover of claim 12 in which said latch lip is positioned on an inside wall of said container adjacent to said opening.

14. The cover of claim 13 in which said plate has a plurality of openings.

15. The cover of claim 14 in which said handle is secured to said plate by said latching means.

16. The cover of claim 15 in which one of said latching means is attached to said non-releasing grip.

17. The cover of claim 16 in which said releasing grip is flexibly mounted on said handle.

18. The cover of claim 17 in which a lock step on said latch lip secures one of said latching means to said latch lip.

19. The cover of claim 7 in which said releasing grip is slidably mounted on said handle.

20. The cover of claim 27 in which said releasing grip is rotatably mounted on said handle.

21. The cover of claim 7 in which said plate has a skirt and thread means on said skirt.

22. The cover of claim 21 in which said container has thread means secured to an outside wall adjacent to said opening.

* * * * *